United States Patent
Pong

(10) Patent No.: US 7,027,562 B2
(45) Date of Patent: Apr. 11, 2006

(54) SYSTEM AND METHOD TO REDUCE ECHOES IN VOICE COMMUNICATIONS

(75) Inventor: Peter Pong, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 179 days.

(21) Appl. No.: 10/655,958

(22) Filed: Sep. 5, 2003

(65) Prior Publication Data

US 2005/0053021 A1    Mar. 10, 2005

(51) Int. Cl.
*H04M 1/24* (2006.01)
*H04M 3/08* (2006.01)
*H04M 1/00* (2006.01)
*H04M 9/00* (2006.01)
*H04B 3/20* (2006.01)

(52) U.S. Cl. .............. 379/3; 379/24; 379/406.01; 379/394; 379/403; 379/404; 370/286

(58) Field of Classification Search .......... 379/1.01, 379/3, 24, 30, 406, 390.04, 391, 392, 394, 379/398, 406.01, 406.04, 406.05, 406.07, 379/406.08; 370/286, 287, 288, 289
See application file for complete search history.

(56) References Cited

U.S. PATENT DOCUMENTS

| | | | | |
|---|---|---|---|---|
| 4,096,361 A | * | 6/1978 | Crawford | 379/403 |
| 5,533,119 A | * | 7/1996 | Adair et al. | 379/391 |
| 5,577,097 A | * | 11/1996 | Meek | 379/3 |
| 5,943,392 A | * | 8/1999 | Olson | 379/3 |
| 6,694,017 B1 | * | 2/2004 | Takada | 379/402 |
| 6,757,383 B1 | * | 6/2004 | Joffe | 379/406.01 |
| 6,928,160 B1 | * | 8/2005 | Ebenezer et al. | 379/406.06 |
| 2001/0033651 A1 | * | 10/2001 | Geiss et al. | 379/399.01 |
| 2003/0123399 A1 | * | 7/2003 | Zhang et al. | 370/286 |
| 2003/0231761 A1 | * | 12/2003 | Zhang et al. | 379/406.01 |

* cited by examiner

*Primary Examiner*—Quoc Tran

(57) ABSTRACT

A system and method to reduce echoes in voice communications are described. Input data containing return loss values of a communication trunk within a communications network is received, the return loss values being measured at each frequency of a plurality of frequencies within a predetermined frequency band. An optimum transhybrid balance impedance is calculated from the input data. Finally, the optimum transhybrid balance impedance is transmitted to a user for further processing.

28 Claims, 6 Drawing Sheets

US 7,027,562 B2

SYSTEM AND METHOD TO REDUCE ECHOES IN VOICE COMMUNICATIONS

FIELD OF THE INVENTION

The present invention relates generally to network communications and, more particularly, to a system and method to reduce echoes in voice communications.

BACKGROUND OF THE INVENTION

Telephone communications systems that use analog trunks are sensitive to echoes caused by impedance mismatches between a central office (CO) and a CO interface card of the respective telephone system. Echoes, which generally occur in analog or time-division multiplexed (TDM) systems, are created when a user's voice signal is reflected back from another point within the transmission path. These echoes are often caused by an impedance mismatch at a trunk card containing a hybrid interface where 2-wire and 4-wire connection facilities meet. The degree of such impedance mismatch is often called transhybrid balance. As the impedance mismatch increases, the echoes become louder and, conversely, as the impedance mismatch decreases, the echoes become fainter.

In Voice over Internet Protocol (VoIP) applications using analog trunks, the echoes are further enhanced by transmission delays and faulty echo cancellers. Thus, the CO interface cards in VoIP systems should have better impedance-matching characteristics than the interface cards used in pure analog or TDM systems. The superior transhybrid balance helps to reduce the echoes that may appear prior to the convergence of the echo canceller of the respective system.

Several techniques have been proposed to reduce echoes in analog, TDM, or VoIP connections. In one such known technique, test signals are sent from a trunk card to the CO through one or more analog trunks and the results are interpreted to characterize the impedance at the CO and, subsequently, to reduce potential echoes. However, this technique requires the use of expensive and sophisticated equipment.

SUMMARY OF THE INVENTION

A system and method to reduce echoes in voice communications are described. Input data containing return loss values of a communication trunk within a communications network is received, the return loss values being measured at each frequency of a plurality of frequencies within a predetermined frequency band. An optimum transhybrid balance impedance is calculated from the input data. Finally, the optimum transhybrid balance impedance is transmitted to a user for further processing.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

According to embodiments described herein, a system and method to reduce echoes in voice communications are described. Input data containing return loss values of a communication trunk within a communications network is received, the return loss values being measured at each frequency of a plurality of frequencies within a predetermined frequency band. An optimum transhybrid balance impedance is calculated from the input data. Finally, the optimum transhybrid balance impedance is transmitted to a user for further processing.

In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
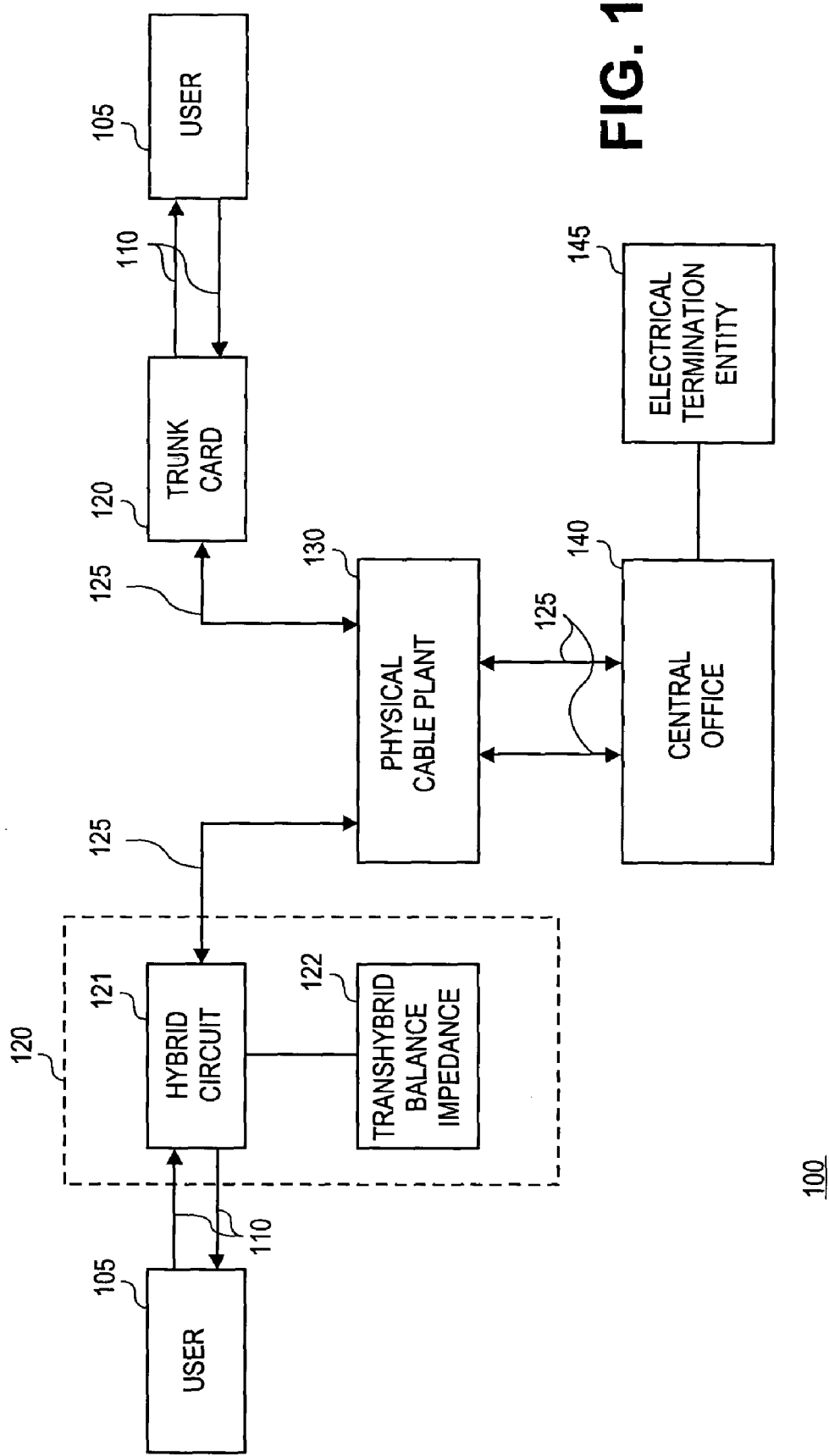
FIG. 1 is a block diagram illustrating a communications network.

FIG. 1 is a block diagram illustrating a communications network 100. As illustrated in FIG. 1, in one embodiment, the communications network 100 includes one or more users 105 coupled to respective communication trunk cards 120 through communication lines 110, such as, for example, 4-wire interface lines. Each trunk card 120 further includes a hybrid circuit 121 and a transhybrid balance impedance 122. Each hybrid circuit 121 is coupled to a central office (CO) 140 of a telephone company through a communication trunk 125, such as, for example, a 2-wire analog trunk, and through a physical cable plant 130. The CO 140 is further coupled to an electrical termination entity 145.

Echoes in communications among users 105 result from a user's voice signal being reflected back from another point in the communication path. The echoes are caused by a mismatch between the transhybrid balance impedance 122 of the trunk card 120 and the network impedance formed by the physical cable plant 130 and the electrical termination entity 145 of the CO 140.

Figure 2:
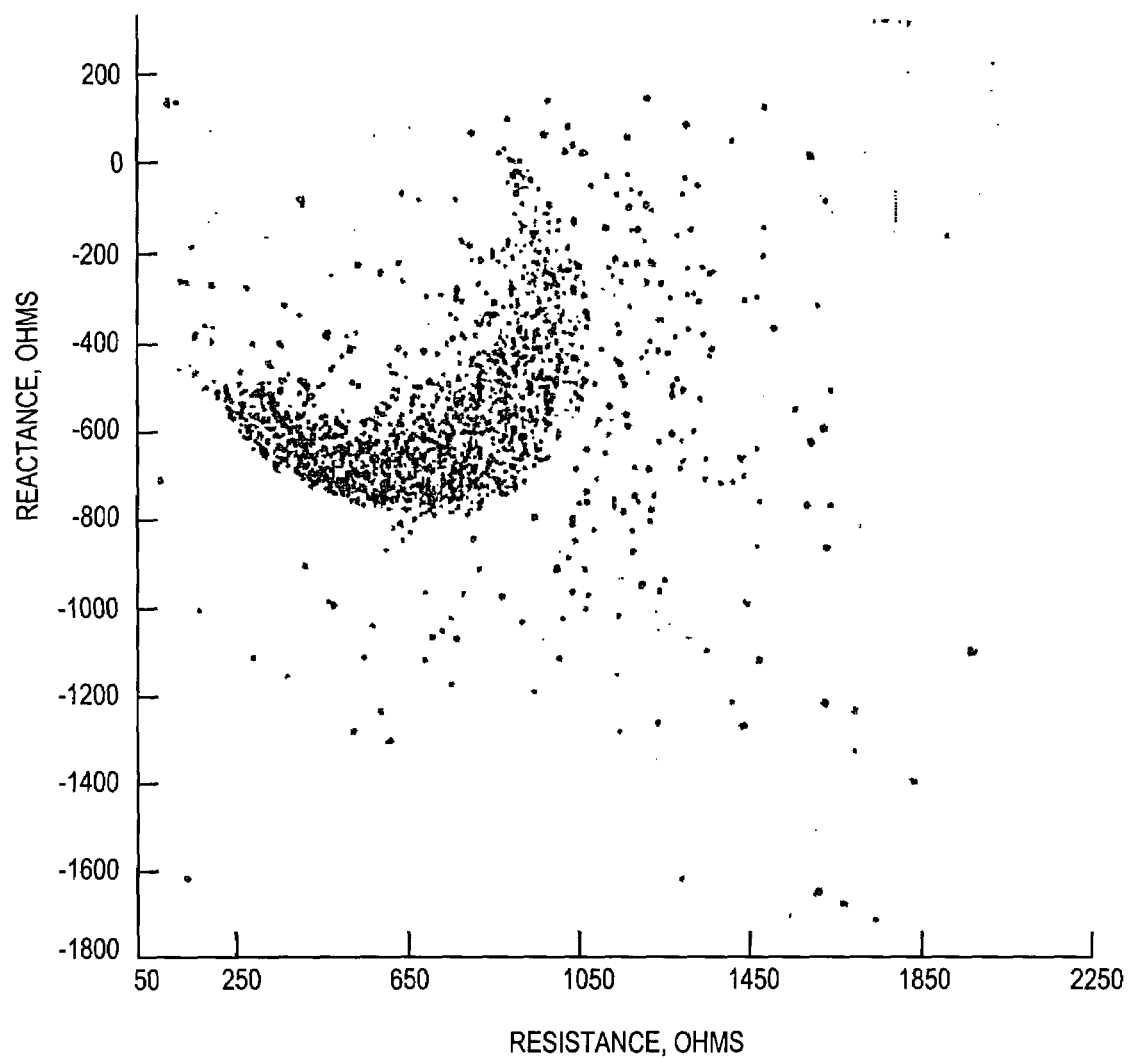
FIG. 2 is a diagram illustrating distributions of impedance characteristics of communication trunks in the communications network.

FIG. 2 is a diagram illustrating distributions of impedance characteristics of communication trunks 125 in the communications network 100. As illustrated in FIG. 2, transmission survey data is plotted as a function of reactance (in Ohms) and resistance (also in Ohms) to create the distributions of impedance characteristics of the communication trunks 125 within the network 100.

Figure 3:
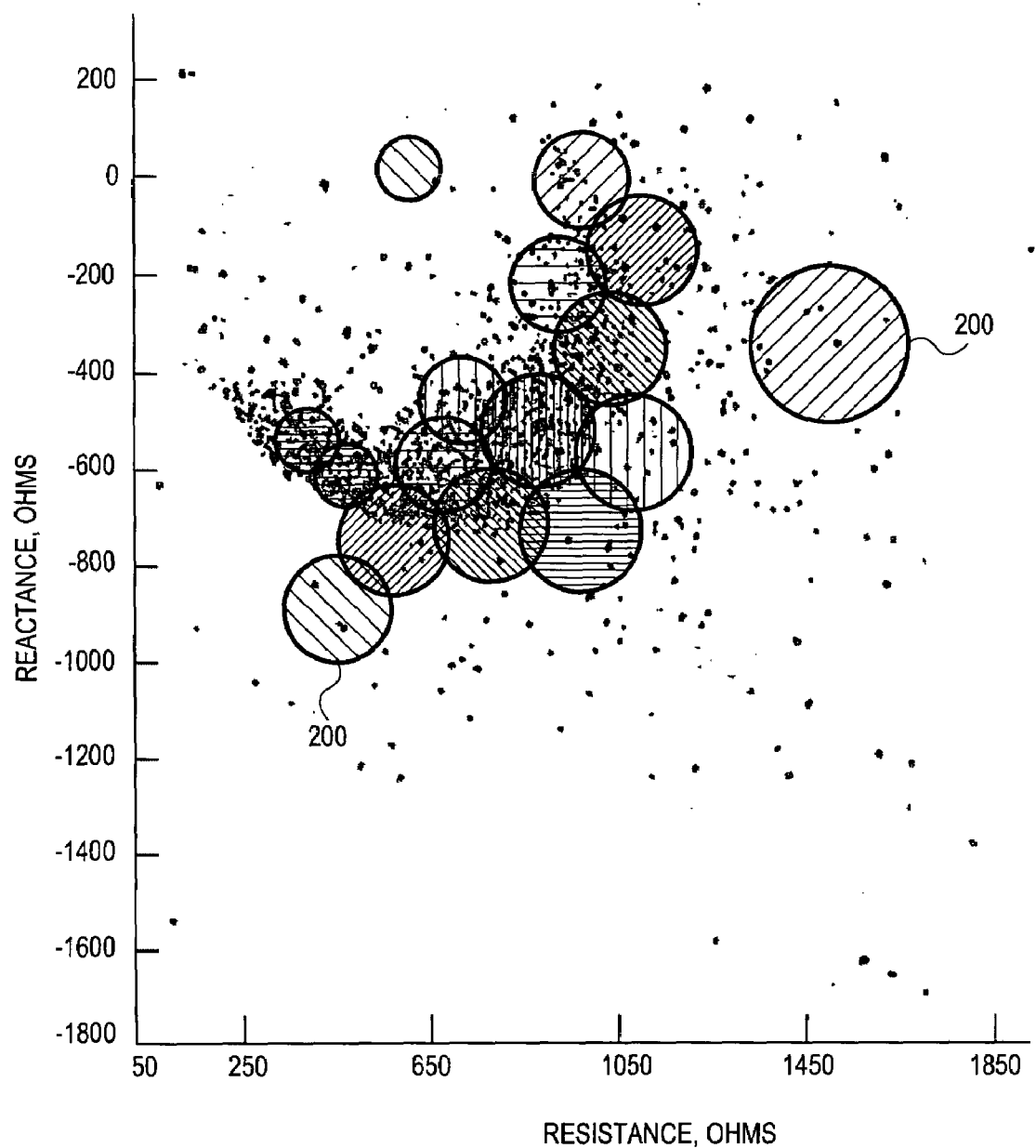
FIG. 3 is a diagram illustrating multiple regions having similar impedance characteristics in the communications network.

FIG. 3 is a diagram illustrating multiple regions having similar impedance characteristics in the communications network 100. As illustrated in FIG. 3, each region 200, also called a return loss circle, is a known graphical tool used to determine the transhybrid balance impedance 122 needed to achieve a predetermined transhybrid loss. The center of each return loss circle 200 is related to the required transhybrid balance impedance 122, while the radius defines the minimum transhybrid loss value. CO trunk impedances that fall within a specific return loss circle 200 have a better transhybrid loss than the required minimum transhybrid loss value. In one embodiment, FIG. 3 illustrates sixteen return loss circles 200 for a transhybrid loss value higher or equal to 25 decibels (dB) and a frequency equal to 1000 Hertz (Hz), but it is to be understood that any number of return loss circles 200 may be created based on different frequency values and different transhybrid loss values.

In one embodiment, subsequent to the creation of multiple return loss circles 200, corresponding physical circuits are created using one of many known circuit synthesis techniques, each physical circuit to implement the required transhybrid balance impedances 122 identified by the return loss circles 200, as shown in TABLE 1.

TABLE 1

| Return Loss Circle | Transhybrid Balance Impedance | Physical Circuit Implementation |
| --- | --- | --- |
| Circle #1 | Network #1 | 600 Ohms |
| Circle #2 | Network #2 | 350 Ohms + (1000 Ohms // 210 nF) |
| Circle #3 | Network #3 | 39 Ohms + (1200 Ohms // 27 nF) |
| Circle #4 | Network #4 | 4700 Ohms // (270 Ohms + 150 nF) |
| Circle #5 | Network #5 | 82 Ohms + (910 Ohms // 47 nF) |
| Circle #6 | Network #6 | 56 Ohms + (910 Ohms // 4.7 nF) |
| Circle #7 | Network #7 | 270 Ohms + (1500 Ohms // 180 nF) |
| Circle #8 | Network #8 | 82 Ohms + (1000 Ohms // 68 nF) |
| Circle #9 | Network #9 | 120 Ohms + (1200 Ohms // 100 nF) |
| Circle #10 | Network #10 | 100 Ohms + (1800 Ohms // 150 nF) |
| Circle #11 | Network #11 | 68 Ohms + (1600 Ohms // 82 nF) |
| Circle #12 | Network #12 | 47 Ohms + (1500 Ohms // 100 nF) |
| Circle #13 | Network #13 | 82 Ohms + (1600 Ohms // 180 nF) |
| Circle #14 | Network #14 | 100 Ohms + (1500 Ohms // 270 nF) |
| Circle #15 | Network #15 | 470 Ohms + (680 Ohms // 68 nF) |
| Circle #16 | Network #16 | 360 Ohms + (1200 Ohms // 100 nF) |

In one embodiment, a return loss profile corresponding to each transhybrid balance impedance 122 identified by the return loss circles 200 is stored in a main memory 304 of a computer system 300 described in further detail below. In the above illustrated example, sixteen return loss profiles are stored in the main memory 304, but it is to be understood that any number of return loss profiles may be created and stored, the number of return loss profiles depending on the number of return loss circles 200 and the respective transhybrid balance impedances 122.

Figure 4:
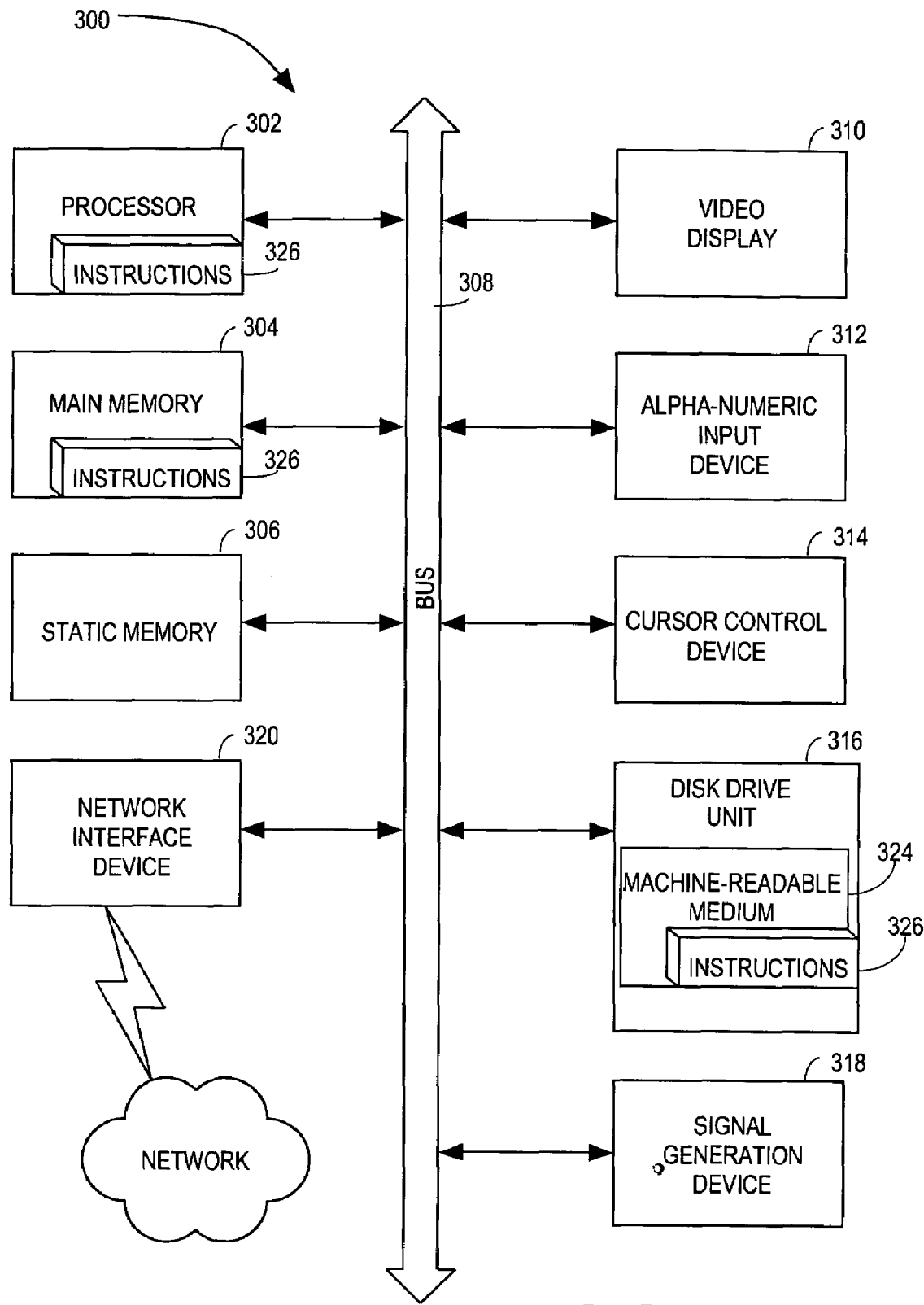
FIG. 4 is a block diagram illustrating a machine in the form of a computer system within which a set of instructions may be executed.

FIG. 4 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, a private-branch exchange (PBX), a web appliance, or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g., a keyboard), a cursor control device 314 (e.g., a mouse), a disk drive unit 316, a signal generation device 18 (e.g., a speaker), and a network interface device 320.

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 320.

In one embodiment, input data, which characterizes an input impedance of a CO trunk 125, is measured in the communications network 100. A user 105 uses a measurement apparatus (not shown), such as, for example, a Sage 930A Communications Test Set apparatus manufactured by Sage Instruments, Inc., to call the silent termination number of the CO 140 and to measure a 2-wire return loss value for the CO trunk 125. The 2-wire return loss value is a frequency-dependent parameter that is directly related to the input impedance of the CO trunk and is measured at several frequencies within the 200–3400 Hz voice frequency band. In one embodiment, ten test frequencies are used to measure corresponding 2-wire return loss values, but it is to be understood that any number of measurements may be made at various frequencies within the above mentioned voice band.

In one embodiment, the input data containing the previously measured 2-wire return loss values is transmitted to the processor 302 within the computer system 300 via the input device 312. The processor 302 receives the input data and calculates an optimum transhybrid balance impedance from the input data, as described in further detail below.

In one embodiment, the processor 302 sequentially compares the 2-wire return loss values contained in the input data to each of the return loss profiles stored within the main memory 304. Thus, for example, the processor 302 calculates an absolute difference between the input data and each stored return loss profile at each frequency of the multiple test frequencies used in the measurement process. The computation provides an initial assessment as to which of the transhybrid balance impedances corresponding to the stored return loss profiles are close to matching the actual impedance of the CO trunk 125.

Subsequently, in one embodiment, the processor 302 applies a C-message weighting function to each computed absolute difference between the input data and the respective stored return loss profile to obtain corresponding weighted return loss values. Since most of the voice signal energy needed for intelligibility falls within a 1000–2500 Hz frequency band, the weighting function emphasizes the signal levels within the 1000–2500 Hz frequency band and deemphasizes the signal levels that fall outside of the above frequency band.

Next, the processor 302 sums the resulting weighted return loss values for each transhybrid balance impedance to obtain a corresponding return loss factor, which indicates how well a respective transhybrid balance impedance matches the impedance of the measured CO trunk 125. Each return loss factor is then scaled and displayed for the user 105.

In one embodiment, each return loss factor is plotted, for example as a bar graph. Alternatively, each return loss factor may be displayed for the user in a table of return loss factor values. The optimum transhybrid balance impedance is then selected and transmitted to the user 105. In one embodiment, the optimum transhybrid balance impedance is the bar graph corresponding to the highest return loss factor. Alternatively, the optimum transhybrid balance impedance is the highest return loss factor value in the table of values displayed for the user 105. The optimum transhybrid balance impedance will then allow the user 105 to configure the trunk card 120 with the matching transhybrid balance impedance 122.

Figure 5:
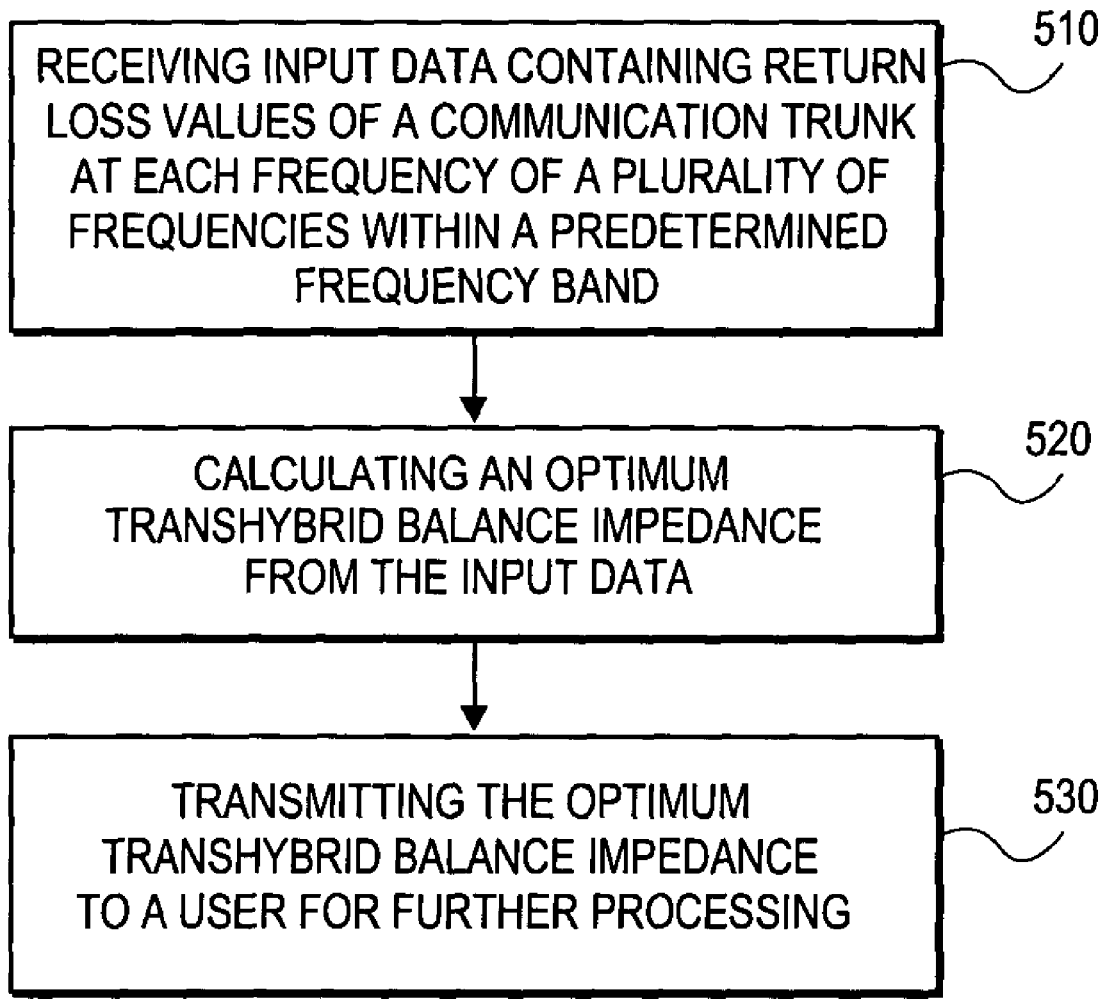
FIG. 5 is a flow diagram illustrating a method to reduce echoes in voice communications, according to one embodiment of the present invention.

FIG. 5 is a flow diagram illustrating a method to reduce echoes in voice communications, according to one embodiment of the present invention. As illustrated in FIG. 5, at processing block 510, input data containing return loss values of a communication trunk is received, the return loss values being measured at each frequency of multiple frequencies within a predetermined frequency band. At processing block 520, an optimum transhybrid balance impedance is calculated from the input data. Finally, at processing block 530, the optimum transhybrid balance impedance is transmitted to the user for further processing.

Figure 6:
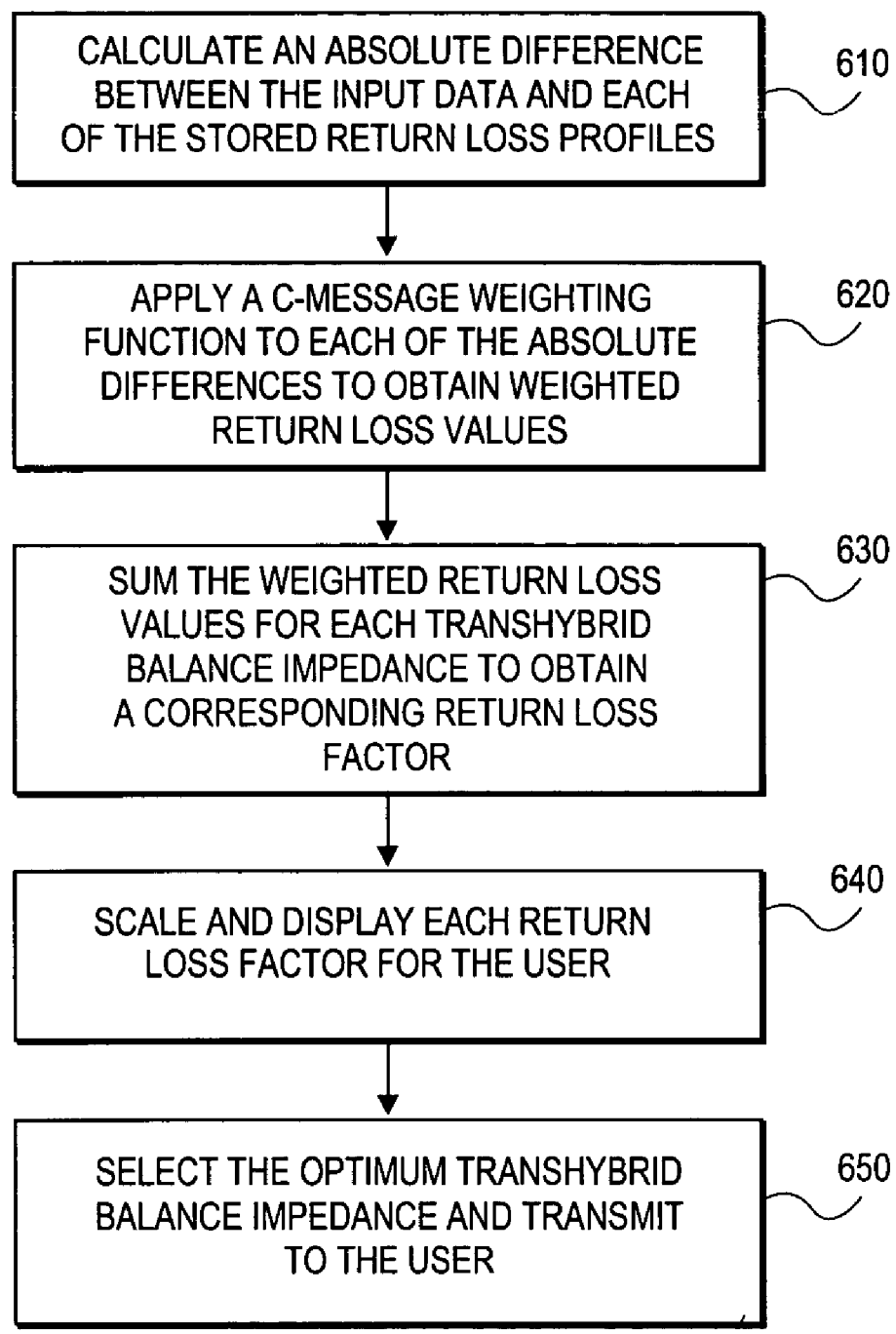
FIG. 6 is a flow diagram illustrating a method to calculate an optimum transhybrid balance impedance, according to one embodiment of the present invention.

FIG. 6 is a flow diagram illustrating a method to calculate an optimum transhybrid balance impedance, according to one embodiment of the present invention. As illustrated in FIG. 6, at processing block 610, an absolute difference is calculated between the input data and each stored return loss profile at each frequency of the multiple test frequencies used in the measurement process.

At processing block 620, a C-message weighting function is applied to each computed absolute difference between the input data and the respective stored return loss profile to obtain corresponding weighted return loss values. At processing block 630, the resulting weighted return loss values for each transhybrid balance impedance are summed up to obtain a corresponding return loss factor.

At processing block 640, each return loss factor is then scaled and displayed for the user. In one embodiment, each return loss factor is plotted, for example as a bar graph. Alternatively, each return loss factor may be displayed for the user in a table of return loss factor values. At processing block 650, the optimum transhybrid balance impedance is selected and further transmitted to the user 105.

It is to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   receiving input data containing return loss values of a communication trunk within a communications network, said return loss values measured at each frequency of a plurality of frequencies within a predetermined frequency band;
   calculating an optimum transhybrid balance impedance from said input data, said calculating including:
   comparing said return loss values contained within said input data to each return loss profile of a plurality of stored return loss profiles, said each return loss profile corresponding to a transhybrid balance impedance of said communication trunk; and
   calculating an absolute difference between said input data and said each return loss profile for said each frequency; and
   transmitting said optimum transhybrid balance impedance to a user for further processing.

2. The method according to claim 1, further comprising:
   applying a weighting function to said absolute difference between said input data and said each return loss profile to obtain corresponding weighted return loss values;
   summing said resulting weighted return loss values for said each transhybrid balance impedance to obtain a corresponding return loss factor; and
   selecting an optimum transhybrid balance impedance based on said corresponding return loss factor.

3. The method according to claim 2, further comprises:
   scaling said corresponding return loss factor for said each transhybrid balance impedance;
   displaying said corresponding return loss factor for said user; and
   selecting a highest return loss factor corresponding to said optimum transhybrid balance impedance.

4. The method according to claim 3, wherein said displaying further comprises plotting said corresponding return loss factor as a bar graph.

5. The method according to claim 3, wherein said corresponding return loss factor is displayed in a table of return loss factor values.

6. The method according to claim 1, wherein said frequency band includes said plurality of frequencies between 200 and 3400 Hertz.

7. The method according to claim 1, wherein said measured return loss values are 2-wire return loss values directly related to an input impedance of said communication trunk.

8. The method according to claim 2, wherein applying said weighting function further comprises:
   emphasizing said absolute difference between said input data and said each return loss profile contained within a voice signal frequency band of said predetermined frequency band.

9. A system comprising:
   means to receive input data containing return loss values of a communication trunk within a communications network, said return loss values measured at each frequency of a plurality of frequencies within a predetermined frequency band;
   means to calculate an optimum transhybrid balance impedance from said input data;
   means for comparing said return loss values contained within said input data to each return loss profile of a plurality of stored return loss profiles, said each return loss profile corresponding to a transhybrid balance impedance of said communication trunk;
   means for calculating an absolute difference between said input data and said each return loss profile for said each frequency; and
   means to transmit said optimum transhybrid balance impedance to a user for further processing.

10. The system according to claim 9, further comprising:
means for applying a weighting function to said absolute difference between said input data and said each return loss profile to obtain corresponding weighted return loss values;
means for summing said resulting weighted return loss values for said each transhybrid balance impedance to obtain a corresponding return loss factor; and
means for selecting an optimum transhybrid balance impedance based on said corresponding return loss factor.

11. The system according to claim 10, further comprising:
means for scaling said corresponding return loss factor for said each transhybrid balance impedance:
means for displaying said corresponding return loss factor for said user; and
means for selecting a highest return loss factor corresponding to said optimum transhybrid balance impedance.

12. The system according to claim 11, further comprising means for plotting said corresponding return loss factor as a bar graph.

13. The system according to claim 11, wherein said corresponding return loss factor is displayed in a table of return loss factor values.

14. The system according to claim 10, further comprising:
means for emphasizing said absolute difference between said input data and said each return loss profile contained within a voice signal frequency band of said predetermined frequency band.

15. A system comprising:
a memory to store a plurality of return loss profiles, each return loss profile corresponding to a transhybrid balance impedance of a communication trunk within a communications network; and
a processor coupled to said memory to receive input data containing return loss values of said communication trunk, said return loss values measured at each frequency of a plurality of frequencies within a predetermined frequency band, to calculate an optimum transhybrid balance impedance from said input data, and to transmit said optimum transhybrid balance impedance to a user for further processing, wherein said processor further compares said return loss values contained within said input data to each return loss profile of said plurality of stored return loss profiles, and calculates an absolute difference between said input data and said each return loss profile for said each frequency.

16. The system according to claim 15, wherein said processor further applies a weighting function to said absolute difference between said input data and said each return loss profile to obtain corresponding weighted return loss values, sums said resulting weighted return loss values for said each transhybrid balance impedance to obtain a corresponding return loss factor, and selects an optimum transhybrid balance impedance based on said corresponding return loss factor.

17. The system according to claim 16, wherein said processor further scales said corresponding return loss factor for said each transhybrid balance impedance, displays said corresponding return loss factor for said user, and selects a highest return loss factor corresponding to said optimum transhybrid balance impedance.

18. The system according to claim 17, wherein said processor further plots said corresponding return loss factor as a bar graph.

19. The system according to claim 17, wherein said processor further displays corresponding return loss factor in a table of return loss factor values.

20. The system according to claim 15, wherein said frequency band includes said plurality of frequencies between 200 and 3400 Hertz.

21. The system according to claim 15, wherein said measured return loss values are 2-wire return loss values directly related to an input impedance of said communication trunk.

22. The system according to claim 16, wherein said processor further emphasizes said absolute difference between said input data and said each return loss profile contained within a voice signal frequency band of said predetermined frequency band.

23. A machine-readable medium containing executable instructions, which, when, executed in a processing system, cause said processing system to perform a method comprising:
receiving input data containing return loss values of a communication trunk within a communications network, said return loss values measured at each frequency of a plurality of frequencies within a predetermined frequency band;
calculating an optimum transhybrid balance impedance from said input data, said calculating including;
comparing said return loss values contained within said input data to each return loss profile of a plurality of stored return loss profiles, said each return loss profile corresponding to a transhybrid balance impedance of said communication trunk; and
calculating an absolute difference between said input data and said each return loss profile for said each frequency; and
transmitting said optimum transhybrid balance impedance to a user for further processing.

24. The machine-readable medium according to claim 23, wherein said method further comprises:
applying a weighting function to said absolute difference between said input data and said each return loss profile to obtain corresponding weighted return loss values;
summing said resulting weighted return loss values for said each transhybrid balance impedance to obtain a corresponding return loss factor; and
selecting an optimum transhybrid balance impedance based on said corresponding return loss factor.

25. The machine-readable medium according to claim 23, wherein said selecting further comprises:
scaling said corresponding return loss factor for said each transhybrid balance impedance;
displaying said corresponding return loss factor for said user; and
selecting a highest return loss factor corresponding to said optimum transhybrid balance impedance.

26. The machine-readable medium according to claim 25, wherein said displaying further comprises plotting said corresponding return loss factor as a bar graph.

27. The machine-readable medium according to claim 25, wherein said displaying further comprises displaying said corresponding return loss factor in a table of return loss factor values.

28. The machine-readable medium according to claim 24, wherein applying said weighting function further comprises:
emphasizing said absolute difference between said input data and said each return loss profile contained within a voice signal frequency band of said predetermined frequency band.

* * * * *